(12) United States Patent
Ganguli et al.

(10) Patent No.: US 7,881,497 B2
(45) Date of Patent: Feb. 1, 2011

(54) VISION BASED NAVIGATION AND GUIDANCE SYSTEM

(75) Inventors: Subhabrata Ganguli, Plymouth, MN (US); Kailash Krishnaswamy, Little Canada, MN (US)

(73) Assignee: Honeywell International Inc., Morristown, NJ (US)

(*) Notice: Subject to any disclaimer, the term of this patent is extended or adjusted under 35 U.S.C. 154(b) by 982 days.

(21) Appl. No.: 11/683,805

(22) Filed: Mar. 8, 2007

(65) Prior Publication Data
US 2008/0219508 A1    Sep. 11, 2008

(51) Int. Cl.
*G06K 9/00* (2006.01)

(52) U.S. Cl. .................. 382/104; 382/173; 382/181; 382/266

(58) Field of Classification Search .......... 382/104, 382/173, 181, 266
See application file for complete search history.

(56) References Cited

U.S. PATENT DOCUMENTS

| | | | |
|---|---|---|---|
| 4,520,889 A | 6/1985 | Abe et al. | |
| 4,647,784 A | 3/1987 | Stephens | |
| 4,907,169 A | 3/1990 | Lovoi | |
| 4,969,202 A | 11/1990 | Groezinger | |
| 4,972,262 A | 11/1990 | Nichols | |
| 5,052,854 A | 10/1991 | Correa et al. | |
| 5,115,477 A | 5/1992 | Groezinger | |
| 5,212,740 A | 5/1993 | Paek et al. | |
| 5,311,600 A | 5/1994 | Aghajan et al. | |
| 5,555,312 A | 9/1996 | Shima et al. | |
| 5,790,403 A | 8/1998 | Nakayama | |
| 5,953,058 A | 9/1999 | Hanagata | |
| 6,008,866 A | 12/1999 | Komatsu | |
| 6,055,467 A | 4/2000 | Mehring et al. | |
| 6,094,508 A | 7/2000 | Acharya et al. | |
| 6,157,876 A | 12/2000 | Tarleton, Jr. et al. | |
| 6,229,578 B1 | 5/2001 | Acharya et al. | |
| 6,233,060 B1 | 5/2001 | Shu et al. | |
| 6,377,711 B1 | 4/2002 | Morgana | |
| 6,445,983 B1 | 9/2002 | Dickson et al. | |

(Continued)

FOREIGN PATENT DOCUMENTS

EP    1906339    4/2008

(Continued)

OTHER PUBLICATIONS

UK Intellectual Property Office, "International Search Report", Jun. 23, 2008, Published in: GB.

*Primary Examiner*—Tom Y Lu
(74) *Attorney, Agent, or Firm*—Fogg & Powers LLC

(57) ABSTRACT

A method of controlling an autonomous vehicle with a vision-based navigation and guidance system. The method includes capturing image frames at a predetermined frame rate. Detecting image points that define an edge in each image frame. Using image points in each image frame to locate a determined edge. Dynamically predicting the location of image points that define an edge in a subsequent image frame. Using the prediction of the location of image points that define an edge to narrow the search area for the edge in the subsequent image frame. Determining offset distances between determined edges in sequential image frames and controlling the vehicle based at least in part on determined offset distances between determined edges in sequential image frames.

20 Claims, 6 Drawing Sheets

U.S. PATENT DOCUMENTS

| | | |
|---|---|---|
| 6,862,368 B1 | 3/2005 | He et al. |
| 6,879,706 B2 | 4/2005 | Satoh et al. |
| 6,898,319 B1 | 5/2005 | Hazra et al. |
| 6,903,359 B2 | 6/2005 | Miller et al. |
| 6,917,721 B2 | 7/2005 | Elad et al. |
| 7,005,974 B2 | 2/2006 | McMahon et al. |
| 7,006,667 B2 | 2/2006 | Akutagawa |
| 7,013,047 B2 | 3/2006 | Schmidt et al. |
| 7,027,615 B2 * | 4/2006 | Chen .................. 382/104 |
| 7,031,525 B2 | 4/2006 | Beardsley |
| 7,038,577 B2 | 5/2006 | Pawlicki et al. |
| 7,068,852 B2 | 6/2006 | Braica |
| 7,088,351 B2 | 8/2006 | Wang |
| 7,512,494 B2 * | 3/2009 | Nishiuchi ............... 701/300 |
| 2002/0006231 A1 | 1/2002 | Jayant et al. |
| 2002/0057195 A1 | 5/2002 | Yamamura |
| 2002/0080019 A1 | 6/2002 | Satoh et al. |
| 2002/0097439 A1 | 7/2002 | Braica |
| 2002/0114519 A1 | 8/2002 | Mastrianni et al. |
| 2003/0031385 A1 | 2/2003 | Elad et al. |
| 2003/0108221 A1 | 6/2003 | Stevenson et al. |
| 2003/0156737 A1 | 8/2003 | Ohtsuka et al. |
| 2003/0223615 A1 | 12/2003 | Keaton et al. |
| 2003/0225487 A1 | 12/2003 | Robert et al. |
| 2004/0016870 A1 | 1/2004 | Pawlicki et al. |
| 2004/0022437 A1 | 2/2004 | Beardsley |
| 2004/0032321 A1 | 2/2004 | McMahon et al. |
| 2004/0081355 A1 | 4/2004 | Takahashi |
| 2004/0146201 A1 | 7/2004 | Sathyanarayana |
| 2004/0158366 A1 | 8/2004 | Dieterle |
| 2004/0174350 A1 | 9/2004 | Wang |
| 2004/0264763 A1 | 12/2004 | Mas et al. |
| 2005/0010798 A1 | 1/2005 | Boo |
| 2005/0105826 A1 | 5/2005 | Yang et al. |
| 2005/0141785 A1 | 6/2005 | Chao |
| 2005/0168657 A1 | 8/2005 | Neuman et al. |
| 2006/0002609 A1 | 1/2006 | Casadei |
| 2006/0066911 A1 | 3/2006 | Miller et al. |
| 2006/0126897 A1 | 6/2006 | Nagaoka et al. |
| 2006/0126898 A1 | 6/2006 | Nagaoka et al. |
| 2006/0126899 A1 | 6/2006 | Nagaoka et al. |
| 2006/0145826 A1 | 7/2006 | McMahon et al. |
| 2006/0147085 A1 | 7/2006 | Wren et al. |
| 2006/0147088 A1 | 7/2006 | Han et al. |
| 2006/0149417 A1 | 7/2006 | Han et al. |
| 2006/0149472 A1 | 7/2006 | Han et al. |
| 2006/0227381 A1 | 10/2006 | He |
| 2006/0233425 A1 | 10/2006 | Kobayashi et al. |

FOREIGN PATENT DOCUMENTS

| | | |
|---|---|---|
| GB | 2246261 | 1/1992 |
| WO | 2007037065 | 4/2007 |

* cited by examiner

VISION BASED NAVIGATION AND GUIDANCE SYSTEM

BACKGROUND

Autonomous vehicles are advantageous because they do not require an operator to physically operate the vehicle. One area where autonomous vehicles would be of benefit is where routine tasks are required of the vehicle. An example of a routine task is mowing grass. Having an autonomous vehicle that was capable of mowing grass is desired. This is especially true for locations with large amounts of grass that need to be maintained such as a golf course. However, constructing an autonomous vehicle to drive in a desired manner is a challenge. For example, using the golf course example, there are fairways and rough areas that differ in the height the grass is to be maintained. In the fairways the grass is cut low so that most balls can be easily played whereas in the rough areas the grass is maintained much longer or even uncut. An autonomous lawn mowing vehicle would have to be designed to detect and maintain the different types of areas. Successful detection of the edge between a fairway and a rough is one requirement that would be needed in constructing a successful autonomous lawn mower. Currently, fairways are maintained using manually operated lawn mowers.

For the reasons stated above and for other reasons stated below which will become apparent to those skilled in the art upon reading and understanding the present specification, there is a need in the art for an autonomous vehicle with an effective vision edge detection system.

SUMMARY OF INVENTION

The above-mentioned problems of current systems are addressed by embodiments of the present invention and will be understood by reading and studying the following specification. The following summary is made by way of example and not by way of limitation. It is a method claim merely provided to aid the reader in understanding some of the aspects of the invention.

In one embodiment, a method of controlling an autonomous vehicle is provided. The method includes capturing image frames at a predetermined frame rate. Detecting image points that define an edge in each image frame. Using image points in each image frame to locate a determined edge. Dynamically predicting the location of image points that define an edge in a subsequent image frame. Using the prediction of the location of image points that define an edge to narrow the search area for the edge in the subsequent image frame. Determining offset distances between determined edges in sequential image frames and controlling the vehicle based at least in part on determined offset distances between determined edges in sequential image frames.

BRIEF DESCRIPTION OF THE DRAWINGS

The present invention can be more easily understood and further advantages and uses thereof more readily apparent, when considered in view of the detailed description and the following figures in which.

In accordance with common practice, the various described features are not drawn to scale but are drawn to emphasize specific features relevant to the present invention. Reference characters denote similar elements throughout Figures and text.

DETAILED DESCRIPTION

In the following detailed description, reference is made to the accompanying drawings, which form a part hereof, and in which is shown by way of illustration specific embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense, and the scope of the present invention is defined only by the claims and equivalents thereof.

Embodiments of the present invention provide an autonomous vehicle that uses an edge detection system in part to navigate. In embodiments of the present invention, images are captured and processed into information regarding an edge to follow. Embodiments of the present invention use both spatial and temporal information in determining an edge.

Figure 1:
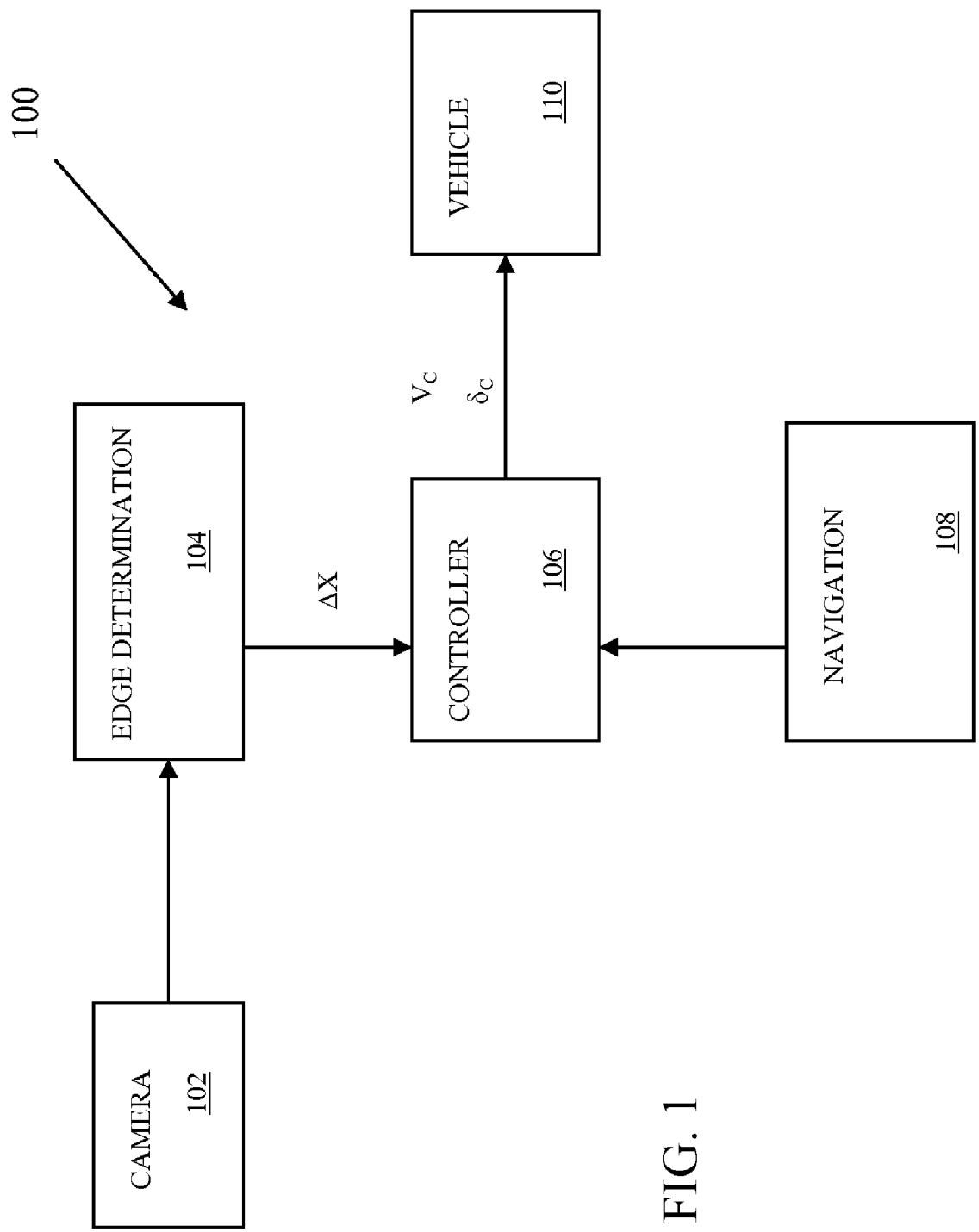
FIG. 1 is a block diagram of an autonomous vehicle system 100 of one embodiment of the present invention.

Referring to FIG. 1, a block diagram of an autonomous vehicle system 100 of one embodiment of the present invention is provided. As illustrated, the autonomous vehicle system 100 includes a camera 102, an edge detection circuit 104, a controller 106, a navigation circuit 108 and a vehicle 110. The camera 102 captures images. The images are communicated to the edge determination circuit 104. The edge detection circuit 104 uses spatial and temporal techniques to determine a distance $\Delta X$. $\Delta X$ is a distance (or offset distance) to an edge determined by the edge determination circuit 104. A $\Delta X$ signal is provided to the Controller 106. The controller 106 uses the $\Delta X$ signal as well as other navigation information provided by the navigation circuit 108 to generate control signals for the vehicle 110. An example of the control signals communicated to the vehicle 110 are a velocity control ($V_C$) and steering control ($\delta_C$). The vehicle 110 implements the received control signals. Examples of navigation information provided to the controller 106 from the navigation circuit 108 include but are not limited to inertial movement unit information, Doppler radar information, global positioning system information, stereo vision information, radar information, mapping information and the like.

Figure 2:
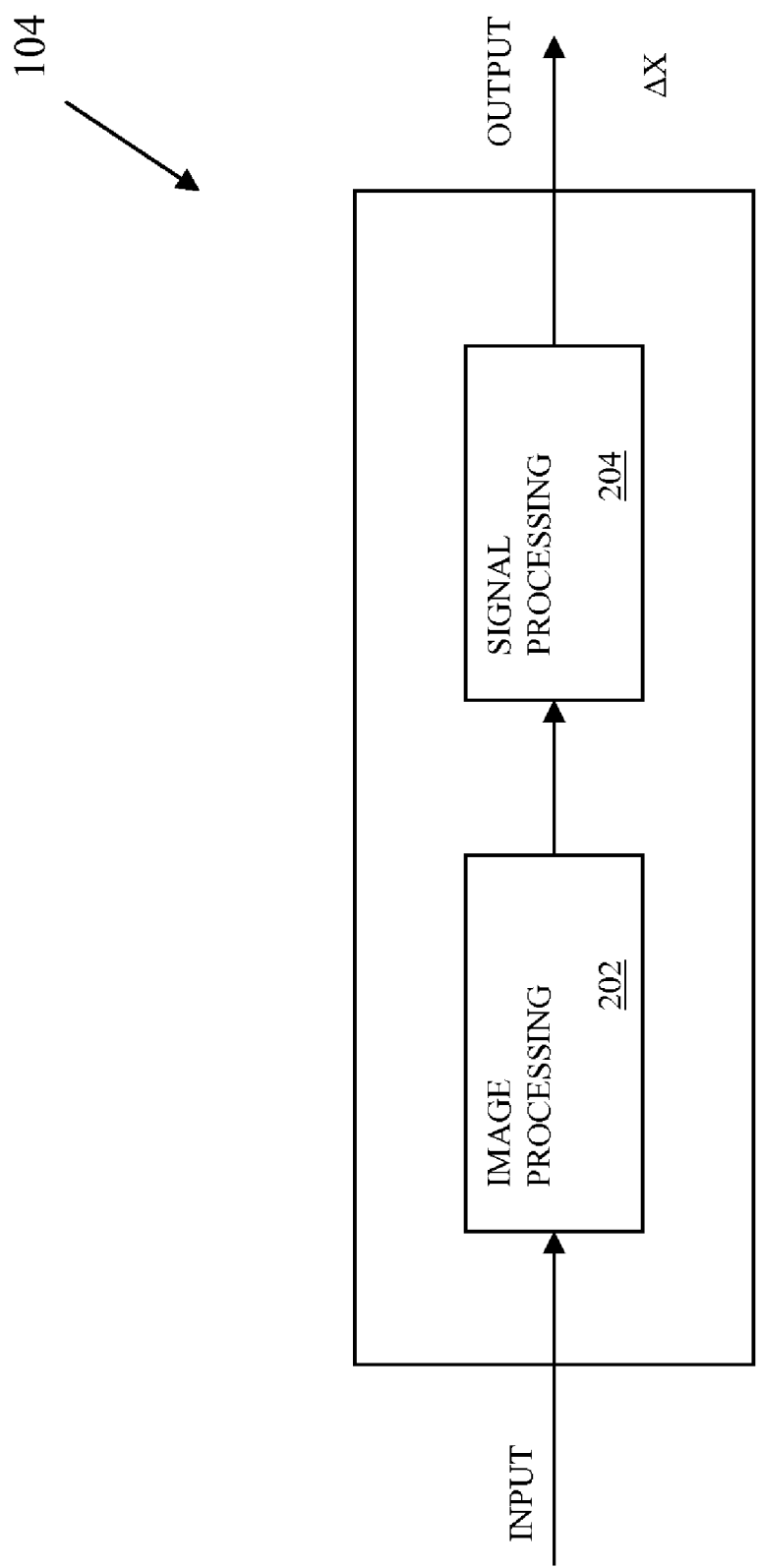
FIG. 2 is a block diagram of an edge determination circuit of one embodiment of the present invention.

An example of the steps taken in the edge determination circuit 104 is provided in FIG. 2. As illustrated, the edge determination circuit 104 includes image processing 202 and signal processing 204. At the image processing 202, each input image from the camera is spatially processed to determine an edge. The determined edge is then passed to the signal processing 204. At the signal processing 204, estimates regarding the location of a detected edge are predicted for a subsequent image. This information is then used to narrow the search of the edge in the next picture frame.

Figure 3:
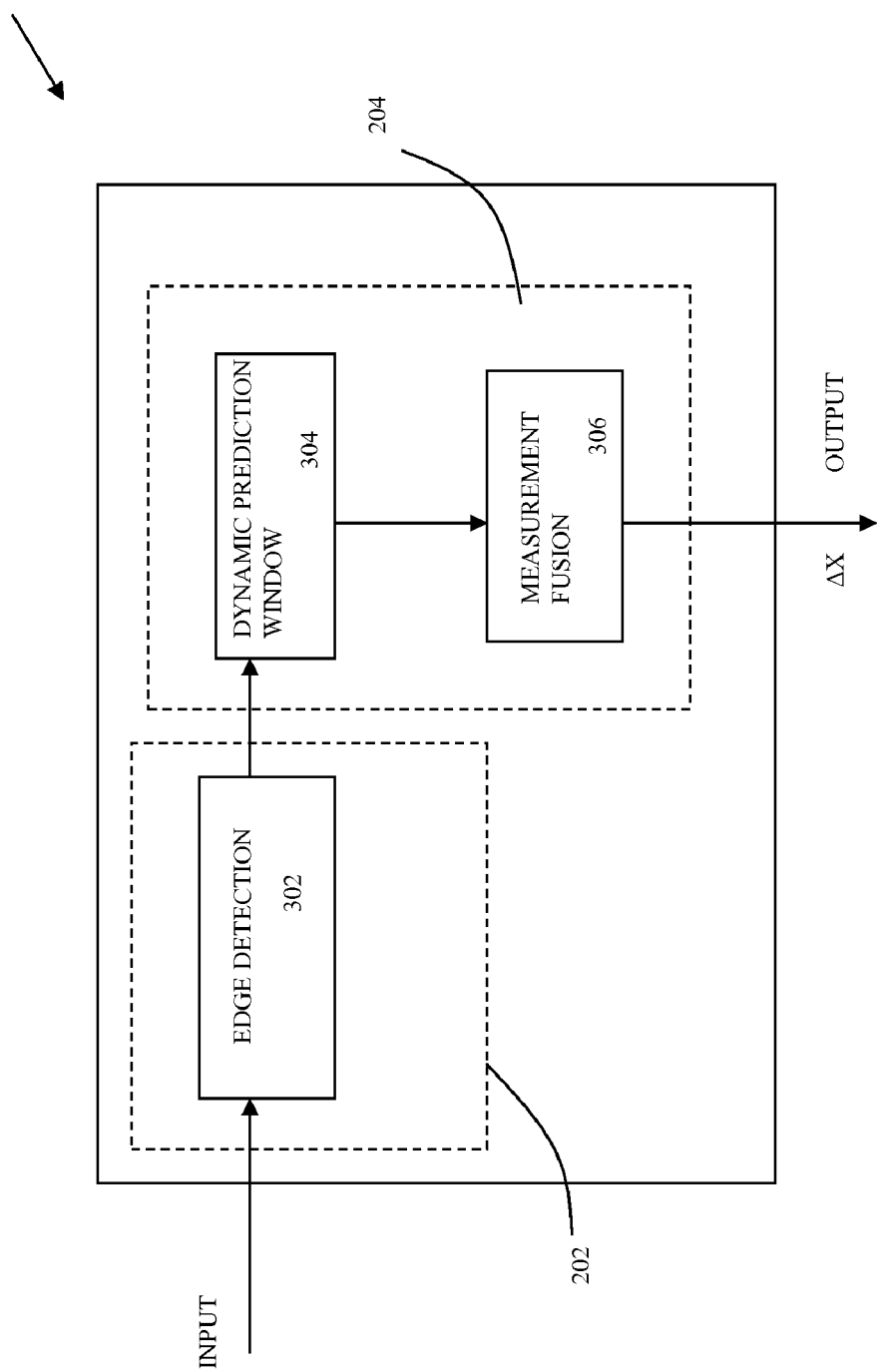
FIG. 3 is a block diagram of an edge determination circuit of another embodiment of the present invention.
Figure 5:
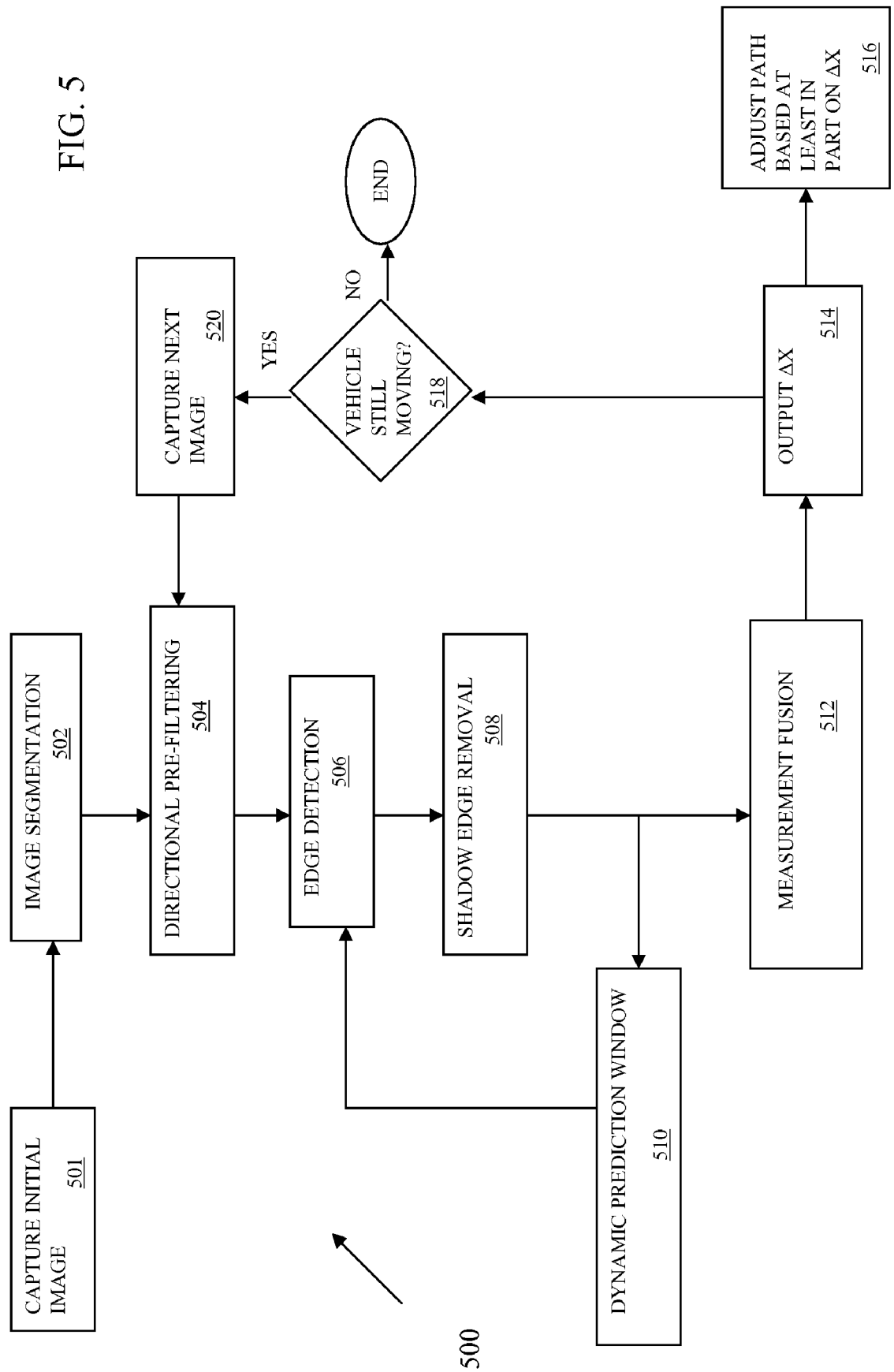
FIG. 5 is an autonomous control flow diagram of one embodiment of the present invention.

A block diagram of an edge determination circuit 104 is provided in FIG. 3. In this example, the image processing 202 includes an edge detection circuit 302. The edge detection circuit 302 performs various steps on each image. The steps may include but are not limited to steps 502, 504, 506 and 508 illustrated in a system flow diagram 500 of FIG. 5. These steps are further described in relation to FIG. 5 provided below. In the embodiment of FIG. 3, the edge diction circuit 302 receives an image from the camera and initially segments the image to narrow the area of the image that has to be analyzed. The edge detection circuit 104 then applies a directional pre-filter step to the segmented image. The directional pre-filter step blurs out edges in the segmented image that are in a direction that is different than the direction a target edge travels. For example, if the target edge travels south to north on the segmented image, edges that travel east to west are blurred out. Stated another way, as the vehicle travels in a direction that is generally parallel to the target edge, edges that are not generally parallel to the target edge are blurred out. After the segment image has blurred out the unwanted edges, an edge detection is performed. An example of an edge detection program (or module) that can be used is a Canny edge detection. Although, a Canny edge detection is discussed any type of edge detection program can be used with the present invention. An edge detection module identifies image pixels (or points) that define an edge. Once the edge is detected, the edge detection circuit 302 identifies and removes shadows.

The edge determination circuit 104 of FIG. 3 also includes a signal processing circuit 204. The signal processing circuit 204 of this embodiment includes a dynamic prediction window 304 and a measurement fusion 306. In one embodiment, the dynamic prediction window 304 solves a constrained least squares problem. The dynamic prediction window 304 estimates where the edge will be in the next image frame. Using this prediction, only a narrow region in the next frame needs to be analyzed. Hence each segmented image is further narrowed to a predicted window image that is to be analyzed. The prediction window image is dynamic since the edge may move from image frame to image frame and hence the prediction window will move accordingly. As FIG. 3 also illustrates, the signal processing circuit also includes a measurement fusion function 306. The measurement fusion function 306 fuses edge points to get a determined edge position. Edge points are pixels in the image that have characteristics of an edge. Characteristics of an edge include adjacent pixels transitioning sharply from light to dark or visa versa. In one embodiment, a Kalman filter is used to fuse the edge points. The measurement function 306 then determines the ΔX which is an offset distance from the determined edge. The ΔX is then outputted in a ΔX signal to a controller 106.

Figure 4A:
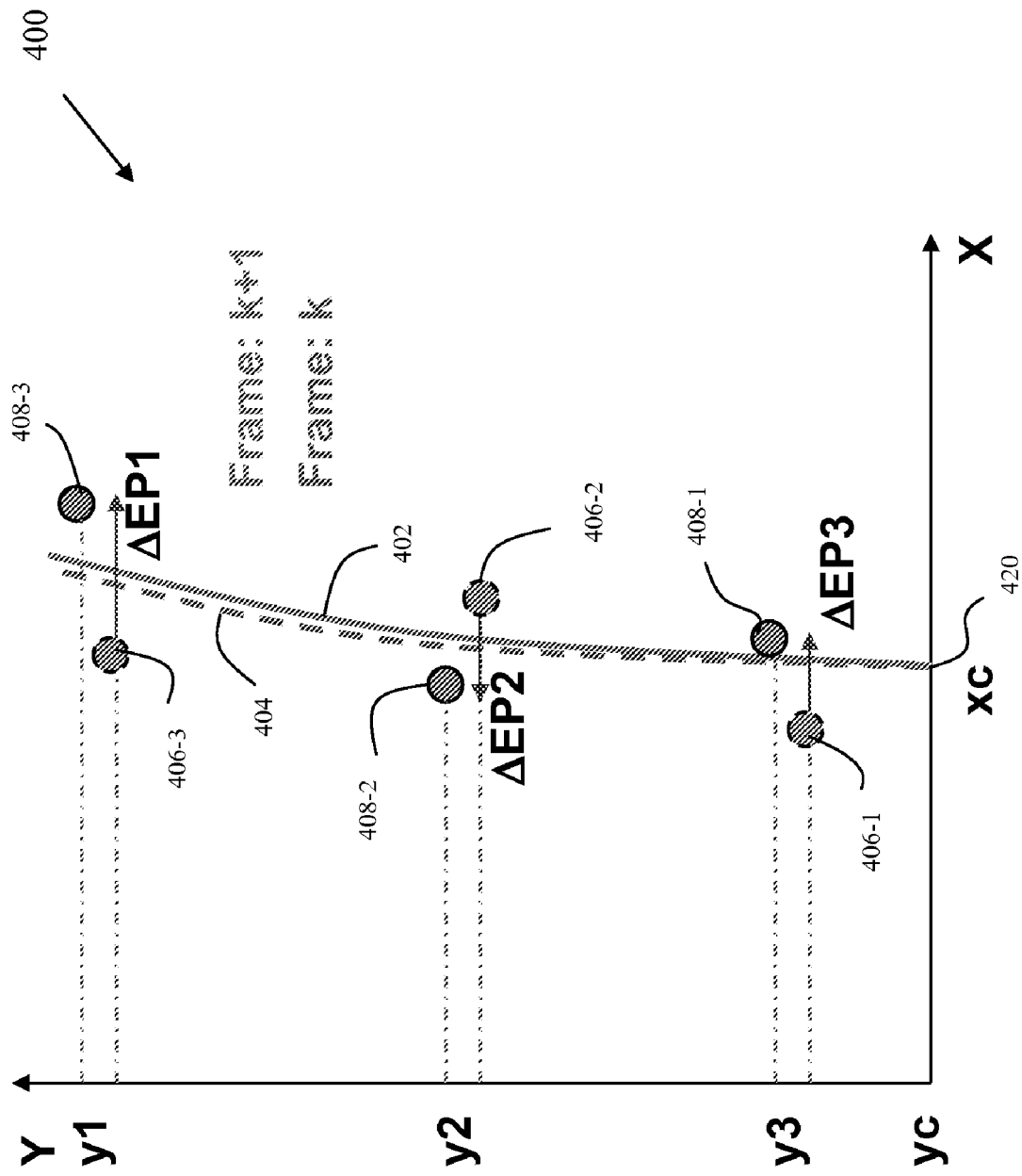
FIG. 4A is a fusion graph illustrating two determined edges in successive frames of one embodiment of the present invention.

An example of determined edges in two successive frames is illustrated in the fusion graph 400 of FIG. 4A. Fusion graph 400 illustrates a determined first edge 404 for a first frame indicated as frame K and a determined second edge 402 for a second frame indicated as frame K+1. As discussed above, a determined edge in an image frame is determined from a plurality of image pixels (or edge points) that define an edge by applying a filter such as a Kalman filter. An illustration of a determined edge is the first determined edge 404 which is determined with the Kalman filter from image points 408-1, 408-2 and 408-3. Similarly, the second determined edge 402 is determined from image points 406-1, 406-2 and 406-3. It will be understood that the number of image pixels (or points) per frame will vary depending on the resolution desired and the number of points illustrated in FIG. 4A are provided merely to illustrate the process. Also illustrated in FIG. 4A is ΔEP1, ΔEP2, ΔEP3 which illustrate the distance the respective edge points 406-1, 406-2 and 406-3 move when passed through the Kalman filter to determine the second edge 402.

Figure 4B:
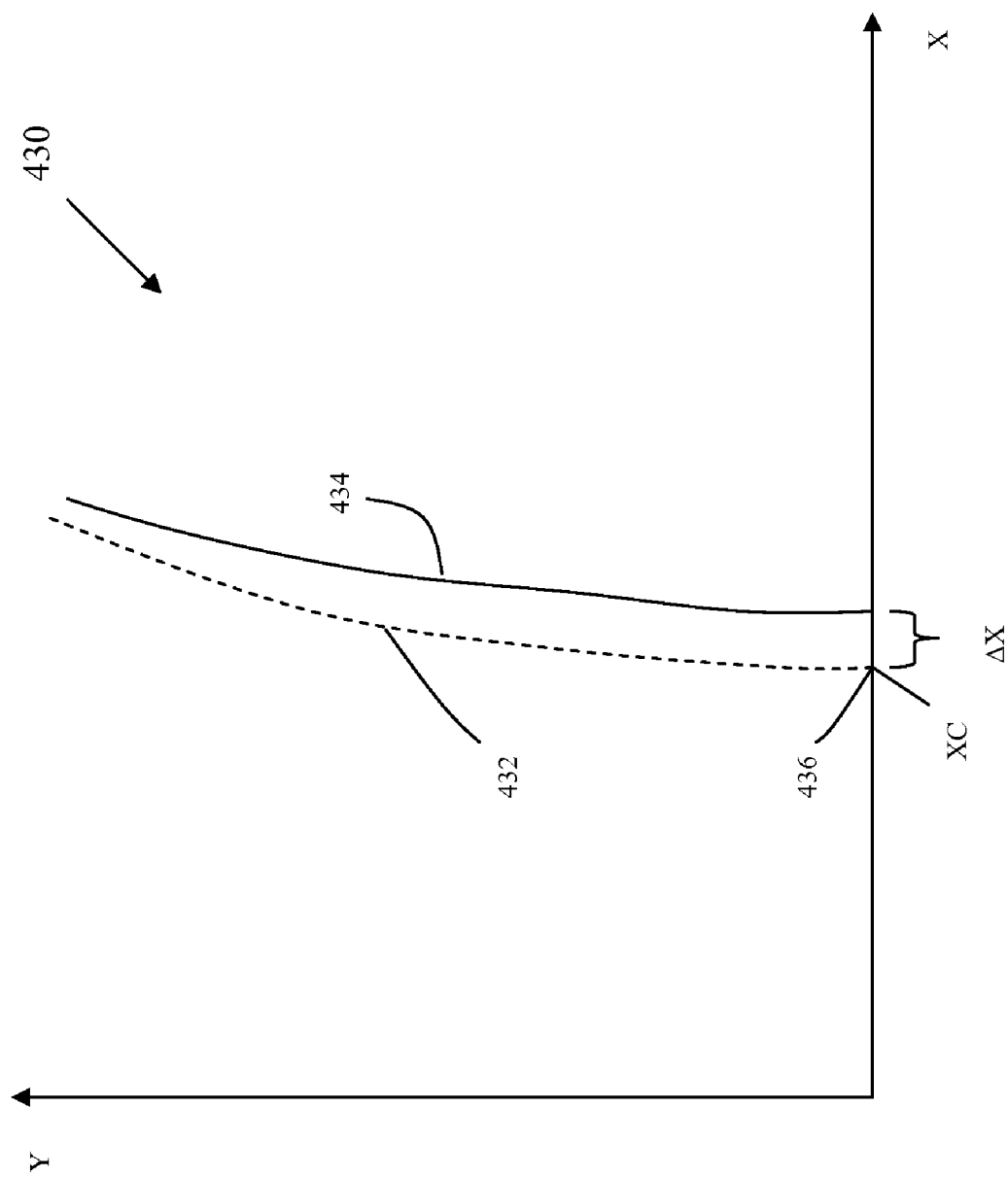
FIG. 4B is another fusion graph illustrating two determined edges in successive frames of one embodiment of the present invention.

Distance XC along the X axis of FIG. 4A indicates the cutter location 420. A distance from the cutter location at the X axis is ΔX. In this example, the distances between the determined edges 404 and 402 is zero at XC. Hence ΔX is equal to zero. Therefore, navigation of the vehicle along the edge is correctly positioned at this time. If however, there was a distance between the first determined edge 402 and the second determined edge 404 at XC, a distance designated as ΔX from XC 420 would be present. ΔX is output to the controller 106, which is zero in this example. The controller 106 then uses ΔX to adjust the position. Since ΔX is zero in this example, no adjustment in direction is needed at this time. Referring to FIG. 4B, an example of another fusion graph 430 is illustrated. In this fusion graph 430, ΔX is not equal to zero. In particular, fusion graph 430 illustrates a first determined edge 432 associated with edge points in a first frame and a second determined edge 434 associated with edge points in a second frame. XC along the X axis is indicated by 436. As illustrated, the second determined edge 434 crosses the X axis at the distance ΔX (or offset distance) from XC 436. It is this ΔX that is outputted to the controller 106. In embodiments of the present invention, the sampling (or rate of obtaining image frames) in the present invention is relatively fast compared to the velocity motion of the vehicle. This allows for the time to process each frame to determine the determined edges and the outputted ΔX. In one embodiment, the sampling frequency is greater than 10 hertz.

FIG. 5 illustrates an autonomous control flow diagram 500 of one embodiment of the present invention. As illustrated, the process starts by capturing an initial image (501). The initial image is then segmented (502). The segmentation defines a field of view which is a relatively small area, such as a box, around a detected edge. The determination of the segmentation in one embodiment is fixed apriori wherein the user makes sure during initialization that the detected edge is within the box. In another embodiment, an automated process is used to generate a position of a fixed size box centered about a distinct edge with the initial frame. Step (502) reduces the number of points (or pixels) that need to be evaluated in determining an edge. Next directional pre-filtering is applied to the image frame (504). As discussed above, the directional pre-filtering blurs edges in directions that are not relatively parallel to the direction of travel of the vehicle. An edge detection algorithm is then applied (506). In one embodiment, the edge detection algorithm is a Canny edge detection algorithm. The edge detection algorithm provides an edge in real time. A shadow edge removal algorithm is then applied (508). The shadow edge removal algorithm removes shadows in the image frame that are not the detected edge. In one embodiment, this is done by looking a dark pixels and surrounding pixels. If too many pixels (user defined) are dark near bright pixels a shadow is present and it is removed. One technique used to determine dark pixels is histogram based thresholding.

After the shadow edge removal (508), the dynamic prediction window is applied (510). This is a constrained least squares problem. The dynamic prediction window is used to predict where the edge will be in the next image frame. As discussed above, it is dynamic since the edge may curve in relation to the image frames and hence determined ΔX values will vary. This is then used to narrow the search for the edge in a subsequent image frame. The results of the dynamic prediction window (510) are applied at the edge detection step (506). In addition, after the shadow edge removal (508), measurement fusion is applied (512). The measurement fusion includes a filter such as but not limited to a Kalman filter known in the art. The Kalman filter is used to find the determined edge based on detected points (or pixels) in an image frame and then determine ΔX as illustrated in FIG. 4B. The ΔX is then output to a controller (514). The controller then adjust the path of the vehicle at least in part on the ΔX (516). It is also determined if the vehicle is still moving at (518). If the vehicle is not moving (518), the process ends. If the vehicle is still moving (518), the process continues at the image segmentation step (502). The flow chart of FIG. 5, merely describes one possible method of implementing functions of the present invention. Other possible implementations are possible and contemplated. Hence, the present invention is not limited to the method set out in the control flow diagram of FIG. 5.

The methods and techniques described here may be implemented in digital electronic circuitry, or with a programmable processor (for example, a special-purpose processor or a general-purpose processor such as a computer) firmware, software, or in combinations of them generally defined as modules. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A method of controlling an autonomous vehicle, the method comprising:
   capturing image frames at a predetermined frame rate;
   detecting image points that define an edge in each image frame, wherein a curvature of the edge changes between at least two image frames;
   fusing image points in each image frame to locate a determined edge;
   dynamically predicting the location of image points that define an edge in a subsequent image frame;
   using the prediction of the location of image points that define an edge to narrow the search area for the edge in the subsequent image frame;
   determining offset distances between determined edges in sequential image frames; and
   controlling the vehicle based at least in part on determined offset distances between determined edges in sequential image frames.

2. The method of claim 1, further comprising:
   blurring edges that are not generally in the direction of travel of the vehicle in each image frame.

3. The method of claim 1, further comprising:
   removing shadows in each image frame.

4. The method of claim 1, wherein detecting image points that define an edge further comprises:
   using a Canny edge detection algorithm.

5. The method of claim 1, wherein fusing image points further comprises:
   using a Kalman filter on the image points that define an edge.

6. The method of claim 1, further comprising:
   segmenting each image frame to reduce the area that needs to be searched for the image points that define an edge.

7. A method of determining an edge in image frames, the method comprising:
   capturing an image frame;
   directionally filtering the image frame to blur out edges not in a desired direction;
   detecting image points that define an edge in each image frame, wherein a curvature of the edge changes between at least two image frames;
   fusing image points to locate a determined edge; and
   outputting the determined edge for use.

8. The method of claim 7, further comprising;
   removing shadows in the image frame.

9. The method of claim 7, wherein detecting image points that define an edge further comprises:
   using a Canny edge detection algorithm.

10. The method of claim 7, wherein fusing image points further comprises:
    using a Kalman filter on the image points that define an edge.

11. The method of claim 7, further comprising:
    dynamically predicting the location of image points that define a subsequent edge in a subsequent image frame based on the outputted determined edge; and
    using the prediction of the location of image points that define the subsequent edge to narrow the search area for the subsequent edge in the subsequent image frame.

12. The method of claim 11, further comprising:
    determining the subsequent edge in the subsequent image frame;
    determining an offset distance between the determined edge in the image frame and the subsequent edge in the subsequent image frame; and
    outputting the offset distance to a controller for use in navigation of a vehicle.

13. A vision-based navigation and guidance system for an autonomous vehicle, the system comprising:
    a camera configured to capture image frames at a predetermined frequency;
    an edge determination device configured to process spatial instantaneous data and process temporal data across image frames wherein a curvature of an edge in a first image frame differs from a curvature of an edge in a second image frame, the edge determination device further configured to output a ΔX signal that is indicative of a distance from a determined edge based on the processed special and temporal data; and a controller in communication with the edge determination device, the controller configured to control the vehicle based at least in part on the ΔX signal.

14. The system of claim 13, wherein the edge determination device further comprises:
an image segmentation module that segments captured images to reduce the area in an image frame that has to be processed.

15. The system of claim 13, wherein the edge determination device further comprises:
a directional pre-filtering module that blurs out edges extending in select directions.

16. The system of claim 13, wherein the edge determination device further comprises:
a Canny edge detection module that detects image pixels in an image frame that form an edge.

17. The system of claim 13, wherein the edge determination device further comprises:
a shadow edge removal module that removes shadows from a captured image.

18. The system of claim 13, wherein the edge determination device further comprises:
a dynamic prediction window that predicts the location of an edge in a subsequent image frame.

19. The system of claim 13, wherein the edge determination device further comprises:
a measurement fusion module configured to find the determined edge based on detected edge points in an image frame.

20. The system of claim 13, further comprising:
a navigation device configured to provide navigation information to the controller that includes at least one of inertial movement unit information, Doppler radar information, global positioning system information, stereo vision information, radar information and mapping information.

* * * * *